United States Patent
Watanabe (10) Patent No.: US 9,525,812 B2
(45) Date of Patent: Dec. 20, 2016

(54) MASTER FLASH APPARATUS AND METHOD

(71) Applicant: CANON KABUSHIKI KAISHA, Tokyo (JP)

(72) Inventor: Hajime Watanabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 167 days.

(21) Appl. No.: 14/588,654

(22) Filed: Jan. 2, 2015

(65) Prior Publication Data

US 2015/0195445 A1   Jul. 9, 2015

(30) Foreign Application Priority Data

Jan. 7, 2014   (JP) ................................. 2014-001236

(51) Int. Cl.
| | |
|---|---|
| *H04N 5/232* | (2006.01) |
| *H04N 5/235* | (2006.01) |
| *G03B 15/05* | (2006.01) |
| *H05B 37/02* | (2006.01) |
| *H05B 41/32* | (2006.01) |

(52) U.S. Cl.
CPC .......... *H04N 5/23209* (2013.01); *G03B 15/05* (2013.01); *H04N 5/2354* (2013.01); *H05B 37/0272* (2013.01); *H05B 41/32* (2013.01); *G03B 2215/0557* (2013.01)

(58) Field of Classification Search
CPC ............ H04N 5/23209; H04N 5/23206; H04N 5/2354; H05B 41/32; H05B 37/0272; H05B 41/14; G03B 15/05
See application file for complete search history.

(56) References Cited

U.S. PATENT DOCUMENTS

| | | | | |
|---|---|---|---|---|
| 6,088,542 A | * | 7/2000 | Yanai | ..................... G03B 15/05 362/16 |
| 6,404,987 B1 | * | 6/2002 | Fukui | ...................... G03B 7/16 396/106 |

(Continued)

FOREIGN PATENT DOCUMENTS

| | | |
|---|---|---|
| JP | 2000-089306 A | 3/2000 |
| JP | 2001-242511 A | 9/2001 |

*Primary Examiner* — Aung S Moe
(74) *Attorney, Agent, or Firm* — Carter, DeLuca, Farrell & Schmidt, LLP (57) ABSTRACT

A master flash apparatus which emits light when an image capturing device outputs a synchronous light emission command after the image capturing device outputs a first light emission start command. The apparatus can perform wireless communication with a slave flash apparatus which emits light in response to a second light emission start command received from the master flash apparatus. A transmission unit transmits the second light emission start command to the slave flash apparatus when a predetermined time has elapsed after the image capturing device outputs the first light emission start command. A measurement unit measures a time from the output of the first light emission start command from the image capturing device to the output of the synchronous light emission command from the image capturing device. An adjustment unit adjusts the predetermined time based on the time measured by the measurement unit.

11 Claims, 9 Drawing Sheets

(56) References Cited

U.S. PATENT DOCUMENTS

| | | | |
|---|---|---|---|
| 6,987,931 B2 * | 1/2006 | Iwasaki | G03B 7/16 396/157 |
| 7,139,472 B2 * | 11/2006 | Yamazaki | G03B 7/16 396/157 |
| 2003/0133018 A1 * | 7/2003 | Ziemkowski | H04N 5/2256 348/211.2 |
| 2010/0202767 A1 * | 8/2010 | Shirakawa | G03B 15/05 396/56 |
| 2010/0209089 A1 * | 8/2010 | King | G03B 17/00 396/56 |
| 2010/0316364 A1 * | 12/2010 | Clark | H04N 5/2256 396/57 |

* cited by examiner

MASTER FLASH APPARATUS AND METHOD

BACKGROUND OF THE INVENTION

Field of the Invention

The present invention relates to a flash imaging system including a plurality of flash apparatuses.

Description of the Related Art

An imaging system which performs light emission control between a master imaging apparatus and slave flash apparatus by performing optical communication by using light emission pulses of the flash has been disclosed (Japanese Patent Laid-Open No. 2000-089306). In the conventional optical communication, however, the directionality is strong because visible light having a short wavelength is used, so no optical communication is correctly performed in some cases if there is an obstacle or the like between apparatuses. Therefore, there is a system which performs light emission control by connecting a master imaging apparatus and slave flash apparatus by using a radio wave of 2.4 GHz called an ISM band (Japanese Patent Laid-Open No. 2001-242511).

In this technique disclosed in Japanese Patent Laid-Open No. 2001-242511, however, an imaging timing is delayed by a delay time from the output of a light emission start command from an image capturing device to the emission of light by an external flash apparatus.

SUMMARY OF THE INVENTION

The present invention makes it possible to take correct imaging timings between a plurality of flash apparatuses without delaying each imaging timing in a flash imaging system including the flash apparatuses.

According to one aspect of the present invention, a master flash apparatus is provided. The master flash apparatus is connected to an image capturing device, and emits light when the image capturing device outputs a synchronous light emission command synchronized with traveling of a shutter after the image capturing device outputs a first light emission start command. The master flash apparatus can perform wireless communication with a slave flash apparatus which emits light in response to a second light emission start command received from the master flash apparatus, and the master flash apparatus comprises a transmission unit configured to transmit the second light emission start command to the slave flash apparatus when a predetermined time has elapsed after the image capturing device outputs the first light emission start command, a measurement unit configured to measure a time from the output of the first light emission start command from the image capturing device to the output of the synchronous light emission command from the image capturing device, and an adjustment unit configured to adjust the predetermined time based on the time measured by the measurement unit.

Further features of the present invention will become apparent from the following description of exemplary embodiments (with reference to the attached drawings).

DESCRIPTION OF THE EMBODIMENTS

Various exemplary embodiments, features, and aspects of the invention will be described in detail below with reference to the drawings.

First Embodiment

Figure 1A:
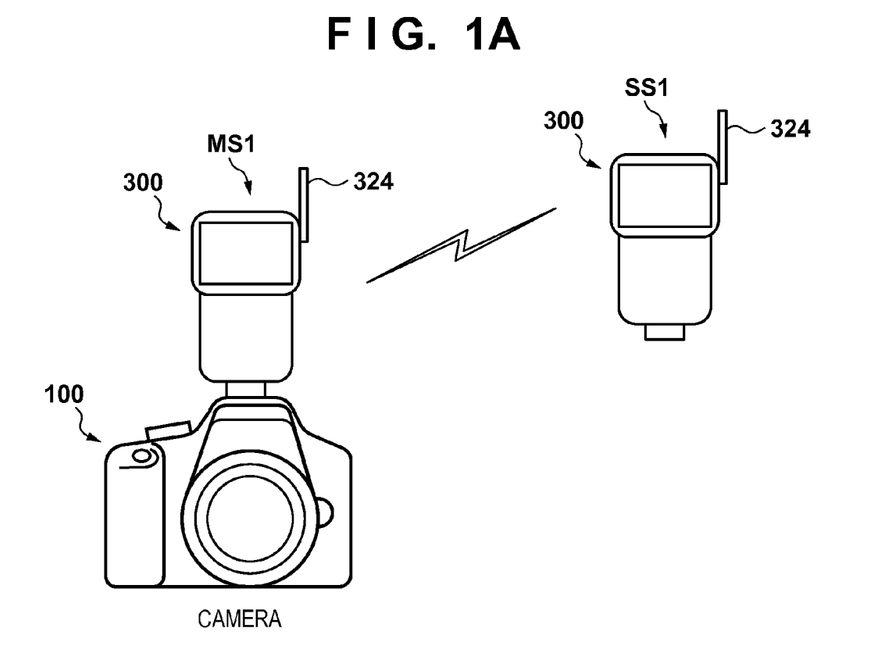
FIGS. 1A and 1B are views showing a flash imaging system according to an embodiment.

FIG. 1A is a view showing an example of a flash imaging system according to this embodiment. A camera body 100 as an image capturing device is, for example, an interchangeable-lens digital camera. A flash apparatus 300 contains a wireless unit for performing wireless communication. Each flash apparatus is connected by wireless communication when set in a wireless mode. When the flash apparatus 300 attached to the camera body 100 is set in a master mode, the flash apparatus 300 functions as a master controller which controls other flash apparatuses. In this embodiment, the flash apparatus 300 is detachable from the camera body 100. As another embodiment, a built-in flash apparatus of the camera body 100 may also function as the master controller. The flash apparatus 300 set in the master mode will be called a master flash MS1. On the other hand, when another flash apparatus 300 installed in a position far from the camera body 100 is set in a slave mode, the flash apparatus 300 functions as a slave apparatus to be controlled by the master flash MS1. The flash apparatus 300 set in this slave mode will be called a slave flash SS1. Note that FIG. 1A shows only one slave flash, but a plurality of slave flashes can exist.

Figure 2:
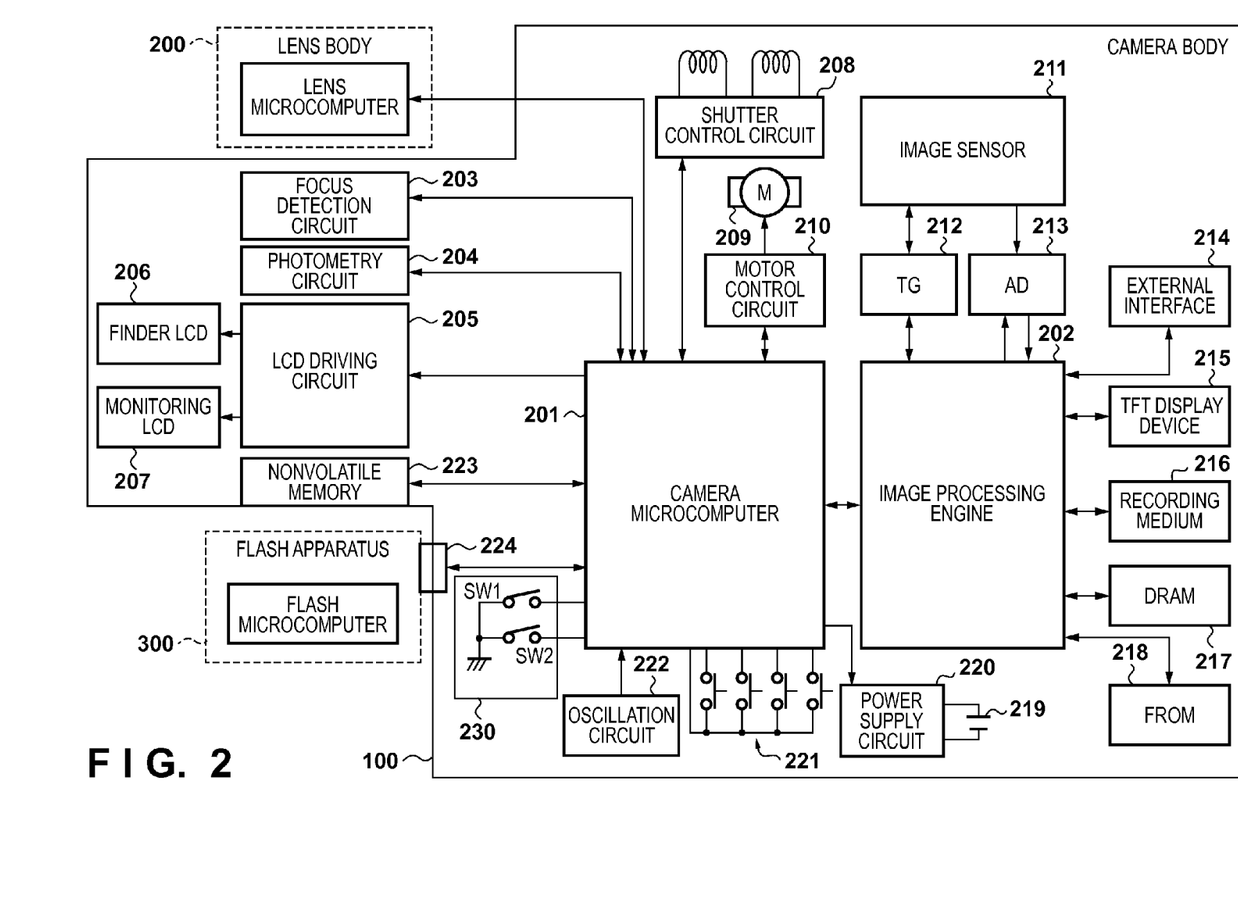
FIG. 2 is a block diagram showing the arrangement of a camera body according to the embodiment.

FIG. 2 is a block diagram showing the arrangement of the camera body 100. A camera microcomputer 201 is a main microcomputer which controls the camera body, and performs power control, switch control, lens control, photometry, distance measurement control, shutter control, communication control, and the like. The camera microcomputer 201 is connected to a power supply circuit 220, a release button 230, and a switch array 221 such as an operating member for operating a GUI (Graphical User Interface) (to be described later). The camera microcomputer 201 is further connected to, for example, an oscillation circuit 222, focus detection circuit 203, photometry circuit 204, LCD driving circuit 205, shutter control circuit 208, motor control circuit 209, and image processing engine 202. Also, the camera microcomputer 201 exchanges signals with an interchangeable imaging lens 200 via a lens microcomputer as a lens control circuit installed in the lens and a lens mount contact.

In accordance with a signal from the camera microcomputer 201, the focus detection circuit 203 performs distance measurement sensor accumulation control and read control, and outputs pixel information to the camera microcomputer 201, thereby performing focus detection by the well-known phase difference detection method. The camera microcomputer 201 performs focus adjustment (AF) of the lens by exchanging signals with the imaging lens 200 based on the focus detection information. The photometry circuit 204 outputs, as an object luminance signal, a luminance signal output from the photometry sensor to the camera microcomputer 201, and performs exposure calculations (AE) such as a well-known f-number calculation and shutter speed calculation. In accordance with a signal from the camera microcomputer 201, the shutter control circuit 208 performs an exposure operation of causing two shutter curtains (not shown) called a first curtain and second curtain to travel by controlling two shutter driving magnets forming a focalplane shutter.

A switch SW1 of the release button 230 is turned on by the first stroke of the release button, and starts AE and AF. A switch SW2 is turned on by the second stroke of the release button, and starts the exposure operation. The camera microcomputer 201 detects signals from the switches SW1 and SW2 and other camera operating members. The LCD driving circuit 205 controls displays of a finder LCD 206 and monitoring LCD 207 in accordance with signals from the camera microcomputer 201.

The image processing engine 202 is a processor for mainly performing digital image processing, and performs accumulation control of an image sensor 211 and read control via a timing generator (TG) 212. The readout image signal undergoes analog/digital conversion performed by an A/D converter 213, and undergoes image processing such as known color interpolation, white balance processing, and gamma processing. Finally, the image signal is converted into digital image data such as JPEG, and temporarily stored in a DRAM 217. In addition, the obtained data is displayed as a quick review on a TFT display device 215, and recorded on a recording medium 216. The TFT display device 215 also displays a GUI for setting the camera, and is so configured as to be able to perform, for example, the various settings of the camera and the setting of the flash apparatus 300 by using the operating members of the switch array 221. A nonvolatile memory 223 can record various kinds of data. The camera body 100 further includes an interface 224 for attaching the flash apparatus 300 so that the flash apparatus 300 can be detached. The interface 224 includes a flash communication terminal which enables communication between the camera body 100 and flash apparatus 300.

Next, the arrangement of the flash apparatus 300 will be explained with reference to FIG. 3. The flash apparatus 300 includes a power battery 301, a boosting circuit 302 for boosting the battery voltage to a few hundred V, a main capacitor 303 for storing electric energy output from the boosting circuit 302, and the following components. Resistors 304 and 305 divide the voltage of the main capacitor 303 at a predetermined ratio. The resistors 304 and 305 are connected to the AD input terminal of a flash microcomputer 326. A coil 306 restricts a light emission current. A diode 307 absorbs a counterelectromotive voltage generated when light emission is stopped. A discharge tube 357 is formed by, for example, a xenon tube, and used as a flash light emission source. A trigger circuit 308 generates a trigger for exciting the discharge tube 357 to emit light. A light emission control circuit 309 controls the light emission of the discharge tube 357.

A data selector 310 selectively outputs D0, D1, or D2 to Y in accordance with a combination of two inputs, that is, Y0 and Y1. A comparator 311 is used to control the luminous intensity of flat light emission. A comparator 312 is used to control the light emission amount of flash light emission. A photodiode 315 is a light-receiving sensor for controlling flat light emission, and monitors the optical output from the discharge tube 357. A photometry circuit 313 amplifies a microcurrent flowing through the photodiode 315, and converts a photocurrent into a voltage. A photodiode 316 is a light-receiving sensor for controlling flash light emission, and monitors the optical output from the discharge tube 357. A photometry integrating circuit 314 logarithmically compresses a photocurrent flowing through the photodiode 316, and compressively integrates the light emission amount of the discharge tube 357. An operation switch 317 is a switch for setting the operation mode (normal, master, or slave) of the flash. A display device 318 displays the operation state of the flash. The display device 318 is formed by an LCD or the like. An LED 319 indicates that the flash apparatus has a charged voltage level capable of predetermined light emission or more. An LED 320 indicates that it was possible to perform imaging with an appropriate light amount of the flash.

An interface 321 for the camera body 100 includes the following flash communication terminals which enable communication between the camera microcomputer 201 and flash microcomputer 326. More specifically, the interface 321 includes an X terminal as a light emission start signal, and a CLK terminal for receiving a communication clock from the camera body 100 described above. The interface 321 also includes a DI terminal for receiving data from the camera microcomputer 201 in synchronism with CLK, and a DO terminal for transmitting data from the flash microcomputer 326 to the camera microcomputer 201 in synchronism with the CLK terminal. The interface 321 further includes a CHG terminal for transmitting the feasibility of light emission of the flash apparatus 300 to the camera microcomputer 201. A nonvolatile memory 322 can record various kinds of data. A wireless unit 323 for wireless communication is formed by a well-known RF chip for processing a wireless protocol such as Zegbee® or BluTooth® for performing, for example, a transmitting/receiving process in a 2.4-GHz band (IMS band).

An antenna 324 is used to exchange radio waves. By exchanging wireless communication packets via the wireless unit 323 and antenna 324, control signals are exchanged between the master flash MS1 and slave flash SS1. The flash microcomputer 326 is a microcomputer for controlling the operation of the whole flash apparatus 300, and contains a program for performing a light emission process, adjustment values for performing various kinds of control, an A/D converter, and the like.

Figure 3:
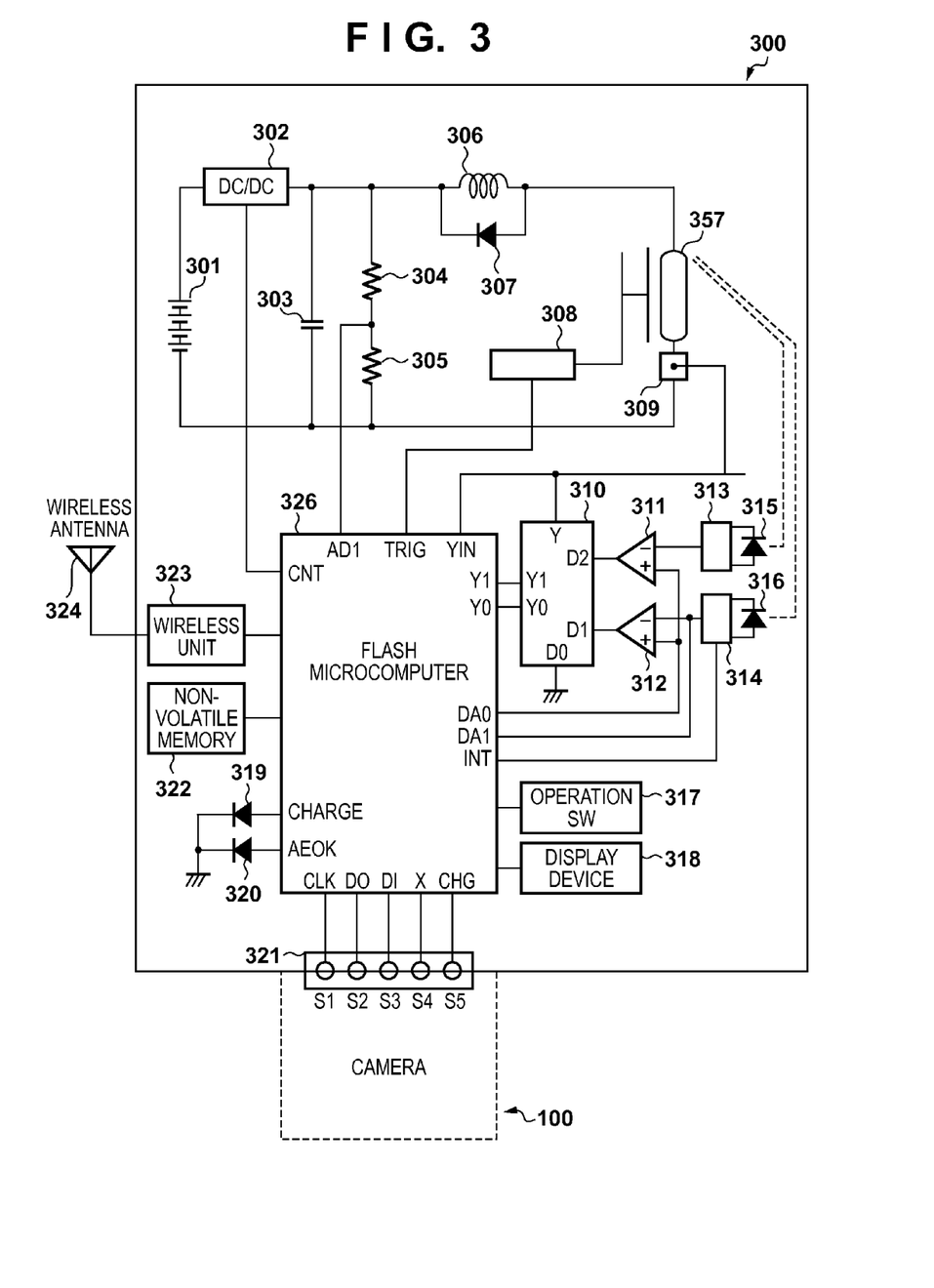
FIG. 3 is a block diagram showing the arrangement of a flash apparatus according to the embodiment.

Note that the wireless unit 323 is incorporated into the flash apparatus 300 in this example shown in FIG. 3, but it may also be incorporated into the camera body 100. Furthermore, the flash apparatus itself may also be incorporated into the camera body 100.

Figure 4:
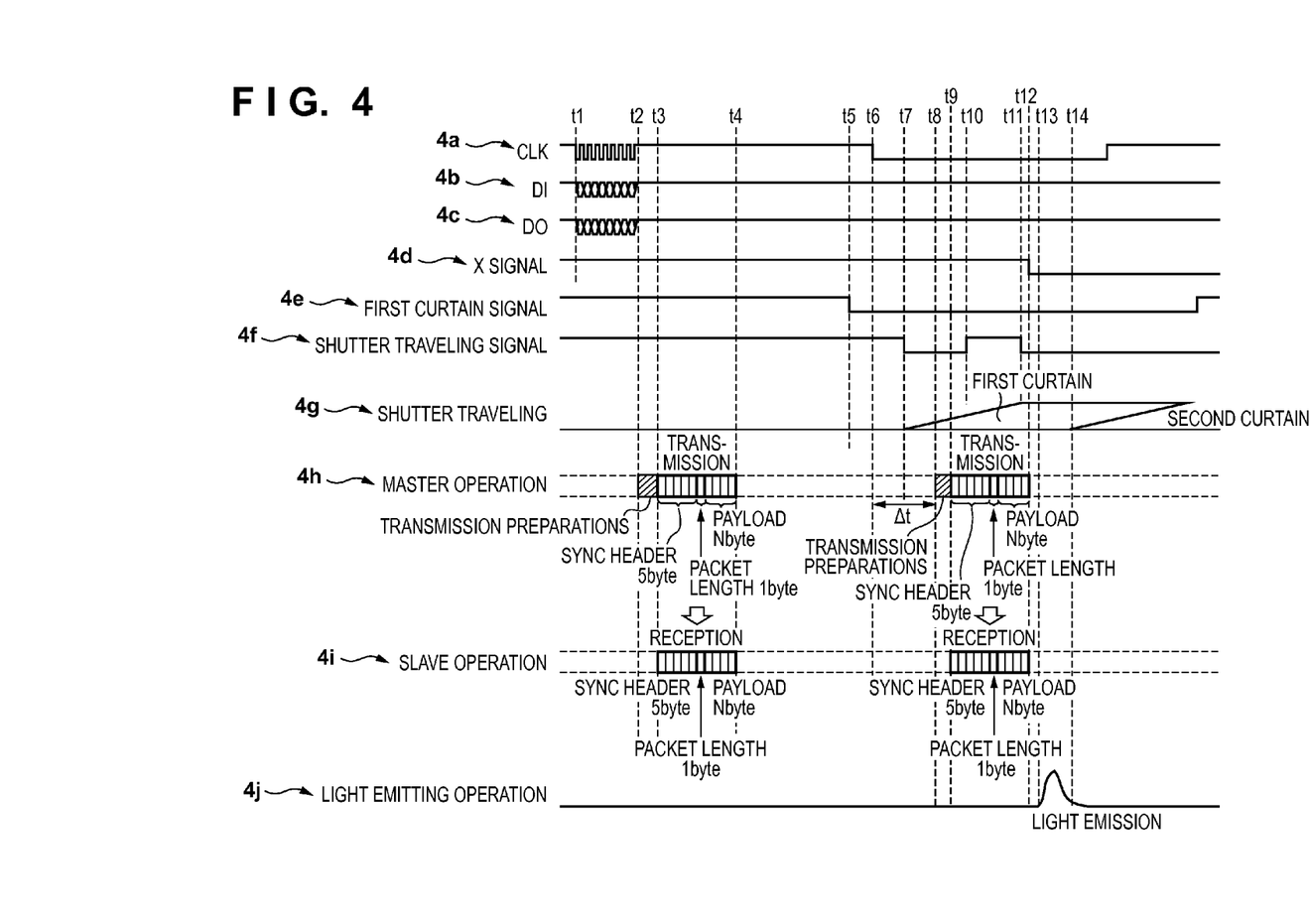
FIG. 4 is a timing chart for explaining the operation of the imaging system according to the embodiment.

The relationship between the wireless communication timing and light emission timing will be explained below with reference to FIG. 4. In FIG. 4, reference symbols 4a, 4b, 4c, and 4d are signals of the communication terminals between the flash apparatus 300 explained with reference to FIG. 3 and the camera body 100. CLK 4a is a sync clock, DI 4b is communication data from the camera to the flash, and DO 4c is communication data from the flash to the camera. X signal 4d shows a signal of the X terminal as a synchronous light emission command of the flash apparatus 300, which is output in synchronization with the traveling of the shutter first curtain.

First curtain signal 4e shows a signal for controlling the shutter driving magnet of the shutter control circuit 208, which causes the first curtain of the shutter to travel (a control signal of the second curtain is not shown). An actual shutter curtain starts opening (the first curtain starts traveling), so that a portion of the image sensor 211 can perform accumulation, at time t7 at which a predetermined time has elapsed after the magnet is controlled (time t5), and the shutter curtain fully opens (the traveling of the first curtain is complete) at time t11.

Shutter traveling signal 4f shows the output from a sensor (not shown) for monitoring the traveling timing of the first curtain of the shutter. Time t7 indicates the start of traveling of the first curtain, time t10 indicates an almost intermediate timing between the start and completion of traveling of the first curtain, and time t11 indicates the completion of traveling of the first curtain. This time from t7 to t11 will be called a shutter traveling time. This shutter traveling time slightly changes from one camera body 100 to another because the shutter curtain performs a physical action.

Shutter traveling 4g shows the traveling of the shutter curtain.

Master operation 4h schematically shows communication of the wireless unit 323 of the master flash MS1.

Slave operation 4i schematically shows communication of the wireless unit 323 of the slave flash SS1.

Light emitting operation 4j shows the light-emitting operation of the discharge tube 357 of the flash apparatus 300.

At time t1 in FIG. 4, the camera body 100 performs well-known serial communication with the master flash MS1. This serial communication is so performed as to designate information such as a light emission mode, for example, preliminary light emission, final light emission, flash light emission, or FP light emission, a light emission amount, and a light emission time to the slave flash SS1.

When this serial communication is complete at time t2, while performing a light emission preparation process for the camera body 100, the flash microcomputer 326 of the master flash MS1 sets the DO line 4c at Lo level, thereby notifying the camera body 100 of a BUSY state. At the same time, the master flash MS1 performs wireless unit transmission preparations (master operation 4h). When the preparations are complete, an actual wireless packet transmission process is performed at time t3. In this embodiment as shown in FIG. 4, a wireless packet contains a 5-byte sync header, 1-byte packet length data, and N-byte payload data, and is transmitted from the master flash MS1 to the slave flash SS1. The first 4-byte portion of the sync header is called a preamble, and data "0" is packed as a fixed pattern. The fifth byte is called an SFD (Start of Frame Delimiter), and hexadecimal "A7", for example, is packed in it. This SFD is added following the preamble, and prevents an operation error occurring with respect to another wireless communication. The SFD also indicates the end of the preamble and the start of transmission data. The next packet length indicates the length of the subsequent payload. Data to be actually transmitted is packed in the payload, and the payload contains a command and data for the flash apparatus.

The slave flash receives light emission mode data from the master flash MS1 by wireless communication at the same time t3, and completes the reception at time t4 (slave operation 4i). The slave flash analyzes the received command, and performs light emission preparations.

Then, the camera microcomputer 201 designates light emission start by setting the CLK terminal at Lo level at time t6 (a first light emission start command). At time t6, the terminal is set at Lo level when a predetermined time, for example, 1 ms has elapsed after control of the first curtain is started at time t5. When the flash microcomputer 326 of the master flash MS1 detects the trailing edge of CLK at time t6, the flash microcomputer 326 inserts a light emission start command (second light emission start command) into the payload, and transmits a wireless packet to the slave flash SS1 at time t8 after the elapse of a predetermined time. The master flash controls the timing of time t8 so as to match this timing with the light emission timing of the master flash. The timing determination method will be explained later.

At time t12, the camera microcomputer 201 notifies the flash microcomputer 326 of the master flash MS1 of the X signal (light emission command) via the X terminal. In response to the detection of this X signal at time T12, the master flash MS1 turns on the light emission control circuit 309, and generates a light emission trigger voltage by operating the trigger circuit 308. However, the discharge tube 357 does not immediately start light emission when given the trigger voltage at time t12, but starts actual light emission at time t13 after the elapse of about 50 μs (a light emission delay).

A case in which the light emission timing of the slave flash SS1 is matched with light emission timing t13 of the master flash will now be explained. Since the light emission command to the slave flash is notified from the master flash MS1 to the slave flash by the wireless packet, a time obtained by adding a wireless communication preparation period, wireless transmission time, and light emission delay is generated as a delay time of the slave flash. When the communication rate is, for example, 250 kbps (250,000 bits per second), the delay time is 4 μs*8 bits=32 μs per 1 byte of wireless communication. Accordingly, when the sync header is 5 bytes, the packet length is 1 byte, and the payload is 2 bytes, a total of 32 μs*8 bytes=256 μs is the delay time. Also, when the transmission preparation time of the wireless unit is 120 μs, a total of 376 μs is a delay time tw of wireless communication. When a light emission delay of 50 μs is further added, the delay time is 426 μs. That is, when causing the slave flash to emit light by notifying light emission start from the master flash MS1 to the slave flash by wireless communication, wireless communication must be started earlier by the above-mentioned delay time than the light emission timing.

The light emission delay time of the slave flash SS1 is 50 μs, that is, almost equal to the light emission delay time of the master flash MS1. Accordingly, if the slave flash SS1 receives the light emission start command at time t12 by the wireless packet and generates the light emission trigger voltage, the slave flash SS1 can emit light at the same timing as that of the master flash MS1. This means that the master flash MS1 need only start wireless transmission at time t8 which is earlier by the delay time tw than time t12.

The timing of time t8 in this embodiment is the time when a predetermined time Δt has elapsed after the flash microcomputer 326 of the master flash MS1 detects the trailing edge of CLK at time t6. Letting Tsx be the time from the trailing edge of CLK at time t6 to the X signal at time t12, the following equation holds:

$$Tsx = \Delta t + tw \quad (1)$$

Since the shutter traveling time changes from one camera body to another as explained with reference to FIG. 4, Tsx and Δt also change from one camera body to another. Accordingly, this embodiment introduces an arrangement which corrects Δt for each camera.

Figure 5:
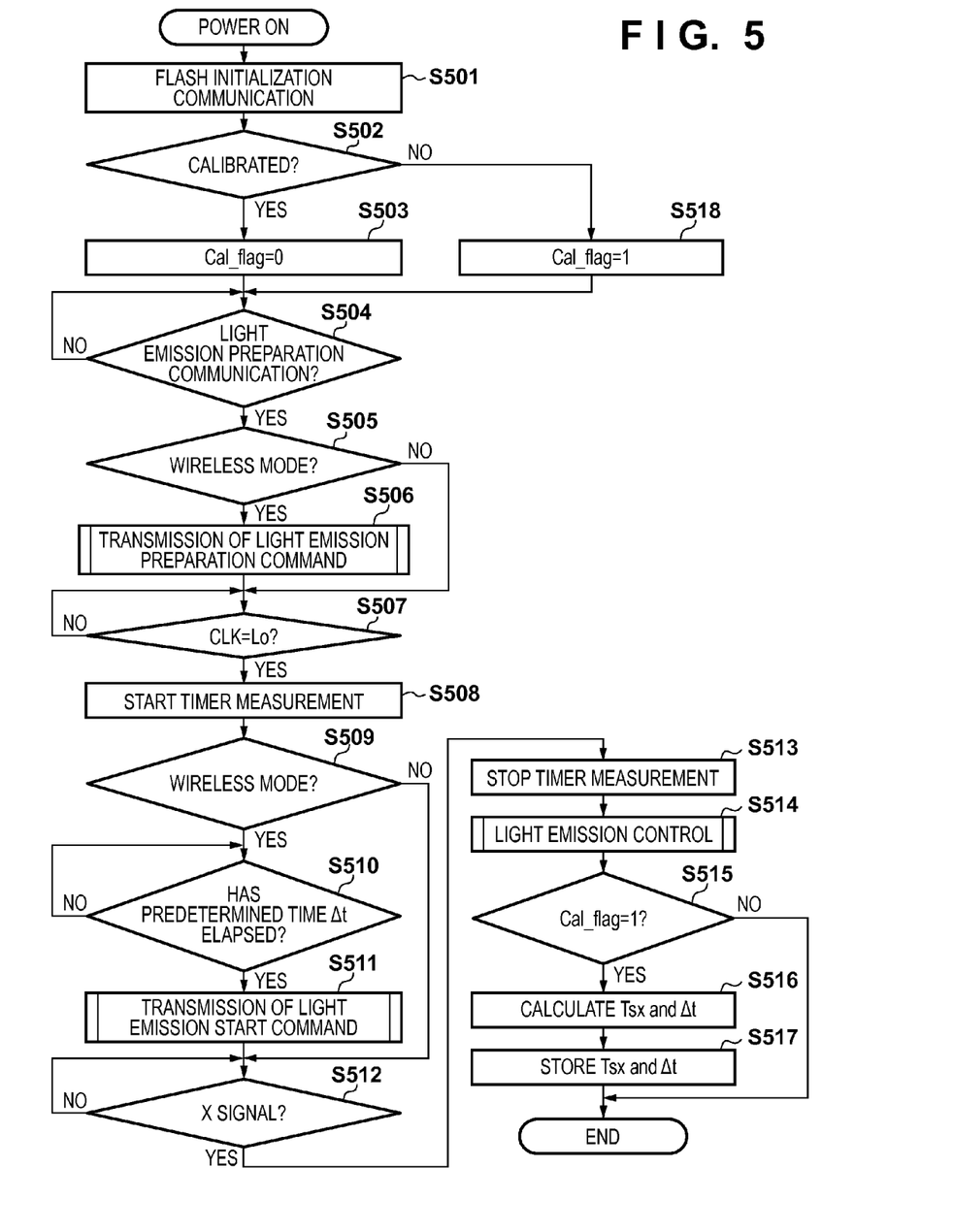
FIG. 5 is a flowchart for explaining an operation example of the flash apparatus according to the embodiment.

Next, the calculations of the time Tsx and Δt to be executed by the flash microcomputer 326 of the master flash MS1 will be explained with reference to a flowchart shown in FIG. 5. This flowchart shown in FIG. 5 explains an operation from the activation of the power supply of the master flash MS1 connected to the camera body 100 to the execution of light emission control. Note that in this embodiment, a process of calculating the time Tsx and Δt and correcting, for each camera, the timing at which the light emission start command is transmitted by the wireless packet will be called calibration.

First, when the master flash MS1 is powered on and activated in step S501, the flash microcomputer 326 performs initialization communication with the camera body 100 via the flash communication terminal. As an example of this initialization communication, the camera body 100 outputs imaging parameters necessary for flash control, the model code and serial number of the camera body, and the like, and the flash apparatus 300 outputs the setting parameters, model code, and serial number of the flash, and the like. The serial number is a unique number given to the camera body 100 or flash apparatus 300 when it is manufactured. Subsequently, in step S502, the flash microcomputer 326 determines whether the connected camera body 100 is already calibrated, based on the model code and serial number of the camera body 100. In this embodiment, the time Tsx and Δt of a calibrated camera are recorded in the nonvolatile memory 322 in association with the model code and serial number of the camera. If the nonvolatile memory 322 does not have the model code and serial number of the camera received by the initial communication, it is determined that the connected camera is not calibrated. If it is determined that the camera is calibrated, the process advances to step S503, and the flash microcomputer 326 of the master flash resets a calibration flag Cal_flag to 0. Cal_flag=0 indicates that calibration has been performed. If it is determined that calibration has not been performed, the process advances to step S518, and the flash microcomputer 326 sets the flag Cal flag to 1.

Then, the process advances to step S504, and the flash microcomputer 326 of the master flash repetitively checks whether light emission preparation communication is received from the camera body 100. When the imaging operation is started, the camera transmits light emission preparation communication. If the flash microcomputer 326 of the master flash receives light emission preparation communication, the process advances to step S505, and the flash microcomputer 326 determines whether the wireless mode is set. If the wireless mode is set, the process advances to step S506, and the flash microcomputer 326 of the master flash transmits a light emission preparation command to the slave flash SS1 by wireless communication. After that, the process advances to step S507. If it is determined in step S505 that the wireless mode is not set, the process advances to step S507. In step S507, the flash microcomputer 326 of the master flash repetitively determines whether the CLK terminal has changed to Lo. If the CLK terminal has changed to Lo (if the first light emission start command is detected), the process advances to step S508, and the flash microcomputer 326 starts timer measurement by using an internal timer (not shown) of the microcomputer.

Then, the process advances to step S509, the flash microcomputer 326 of the master flash determines whether the wireless mode is set. If the wireless mode is not set, the process advances to step S512. If the wireless mode is set, the process advances to step S510, and the flash microcomputer 326 determines whether the predetermined time Δt has elapsed since the CLK terminal has changed to Lo. As Δt, the time recorded in the nonvolatile memory 322 is used if calibration has been performed, and a default value predetermined for each camera model is used if calibration has not been performed. If the predetermined time Δt has elapsed, the process advances to step S511, and the flash microcomputer 326 of the master flash transmits the light emission start command (second light emission start command) to the slave flash SS1 by wireless communication. After that, the process advances to step S512. In step S512, the flash microcomputer 326 of the master flash determines whether the X signal is detected. If the X signal is detected, the process advances to step S513, and the timer having started measurement in step S508 is stopped. This means that the flash microcomputer 326 of the master flash has measured the time Tsx from time t6 to time t12 explained with reference to FIG. 4. Then, the process advances to step S514, and the flash microcomputer 326 turns on the light emission control circuit 309, and executes light emission control of generating the light emission trigger voltage by operating the trigger circuit 308.

Subsequently, the process advances to step S515, and whether Cal_flag is 1 is determined. If Cal_flag is 0, that is, calibration has been performed, a series of light emission control steps are terminated. If Cal_flag is 1, that is, calibration has not been performed in step S515, the process advances to step S516. In step S516, the flash microcomputer 326 obtains the time Tsx measured by the timer, and calculates the predetermined time Δt from the wireless communication delay time tw by using equation (1). The delay time tw is a time unique to the flash apparatus, and is uniquely determined in accordance with the performance of the wireless unit. Then, the process advances to step S517, and the calculated Tsx and Δt are recorded in the nonvolatile memory 322 in association with the model code and serial number of the camera body 100. From the next light emission control, the stored Δt is used in the determination in step S510.

Modification

In the above-described embodiment, calibration is performed during the imaging operation. If calibration has not been performed, however, control may also be so performed as to prompt the user of the camera to execute calibration. This modification will be explained with reference to a flowchart shown in FIG. 6.

Figure 6:
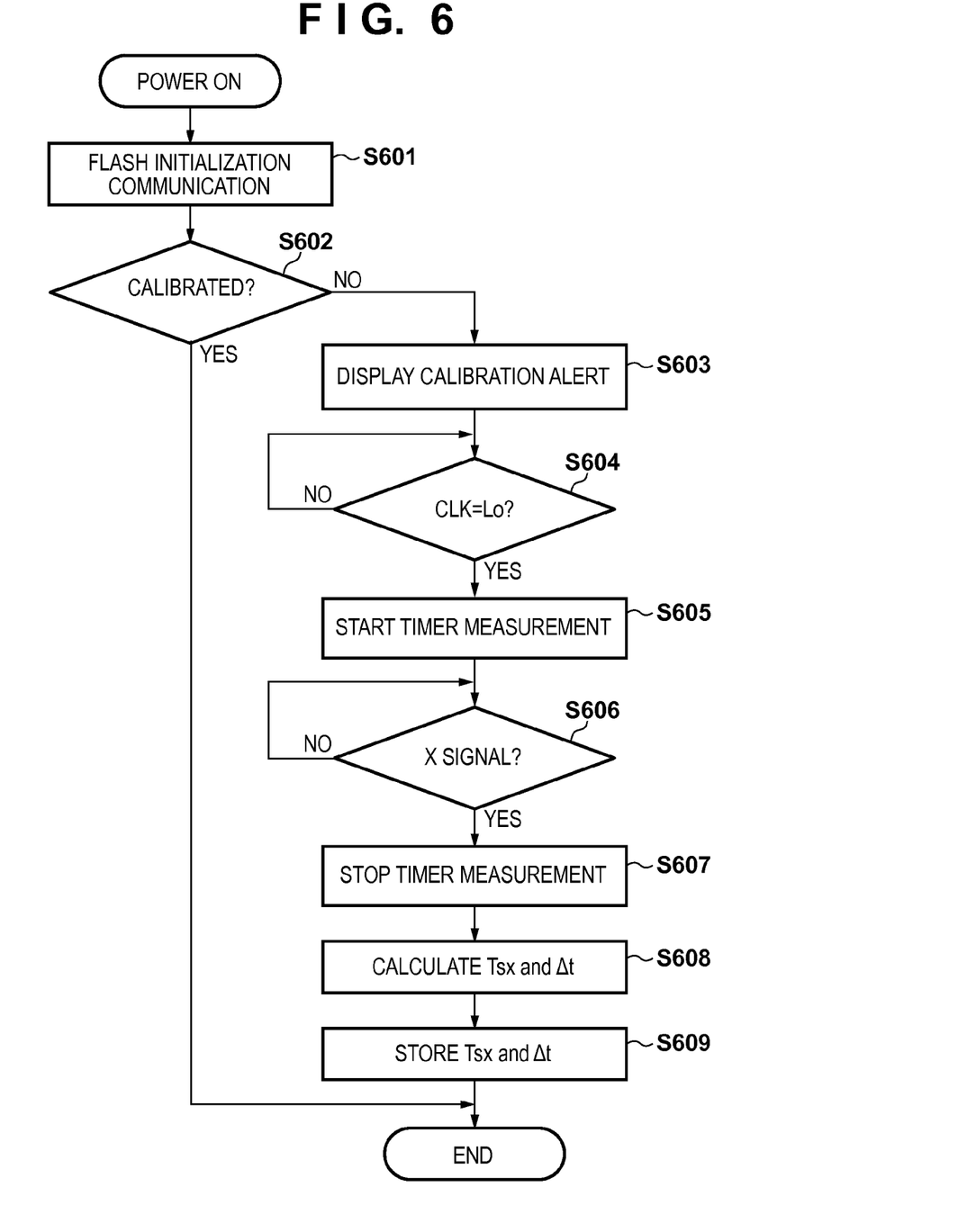
FIG. 6 is a flowchart for explaining another operation example of the flash apparatus according to the embodiment.

First, when the master flash MS1 is powered on and activated in step S601, initialization communication is performed with the camera body 100 via the flash communication terminal. The contents of this initialization communication are the same as those explained with reference to FIG. 5. Subsequently, in step S602, the flash microcomputer 326 determines whether calibration has been performed. If it is determined that calibration has been performed, the flash microcomputer 326 terminates the process. If it is determined that calibration has not been performed, the process advances to step S603, and the flash microcomputer 326 displays an alert on the display device 318 in order to prompt the camera user to execute calibration. This alert makes it possible to cause the camera user to execute calibration. The execution of calibration can be started by operating the release button by the camera user, or by performing an operation by using the GUI of the camera of flash. When the execution of calibration is started, shutter control is performed in the same manner as that for the imaging sequence. Then, the process advances to step S604. In step S604, the flash apparatus 300 repetitively determines whether the CLK terminal has changed to Lo. When the CLK terminal has changed to Lo, the process advances to step S605, and the flash microcomputer 326 starts timer measurement by using the internal timer (not shown) of the microcomputer.

Subsequently, the process advances to step S606, and whether the X signal is detected is repetitively determined. If the X signal is detected, the process advances to step S607, and the timer having started measurement in step S605 is stopped. This means that the time Tsx from time t6 to time t12 explained with reference to FIG. 4 is measured. Then, the process advances to step S608, and the flash microcomputer 326 obtains the time Tsx measured by the timer, and calculates the predetermined time Δt from the wireless communication delay time tw by using equation (1). After that, the process advances to step S609, and the calculated Tsx and Δt are recorded as correction values in the nonvolatile memory in association with the model code and serial number of the camera body 100.

Note that the timer is started by the Lo signal of CLK and stopped by the X signal in this embodiment, but it is also possible to use, for example, the monitoring signal of the shutter first curtain or the operation of the release button. That is, various modifications and changes can be made without departing from the spirit and scope of the invention. Also, the correction value of the transmission timing is recorded for each camera. However, it is also possible to detect the posture of the camera by using an acceleration sensor or the like, and calculate and record the correction value of the transmission timing for each posture of the camera, for example, a regular position or vertical position of the camera. Furthermore, it is also possible to calculate and record the correction value for each condition, such as an environmental temperature or aging, which changes the shutter traveling time.

In this embodiment as explained above, the time from the output of the Lo signal of CLK as the first light emission start command from the camera body 100 to the X signal as the synchronous light emission command is measured. Then, based on the measured time and the delay time of wireless communication, the timing of transmission of the second light emission start command to the slave flash is adjusted. This makes it possible to match the light emission timing of the master flash apparatus with that of the slave flash apparatus. That is, since the master control apparatus adjusts the timing of transmission of the control command to the slave control apparatus for each camera, it is possible to match the control timing of the master control apparatus with that of the slave control apparatus.

Second Embodiment

Figure 7:
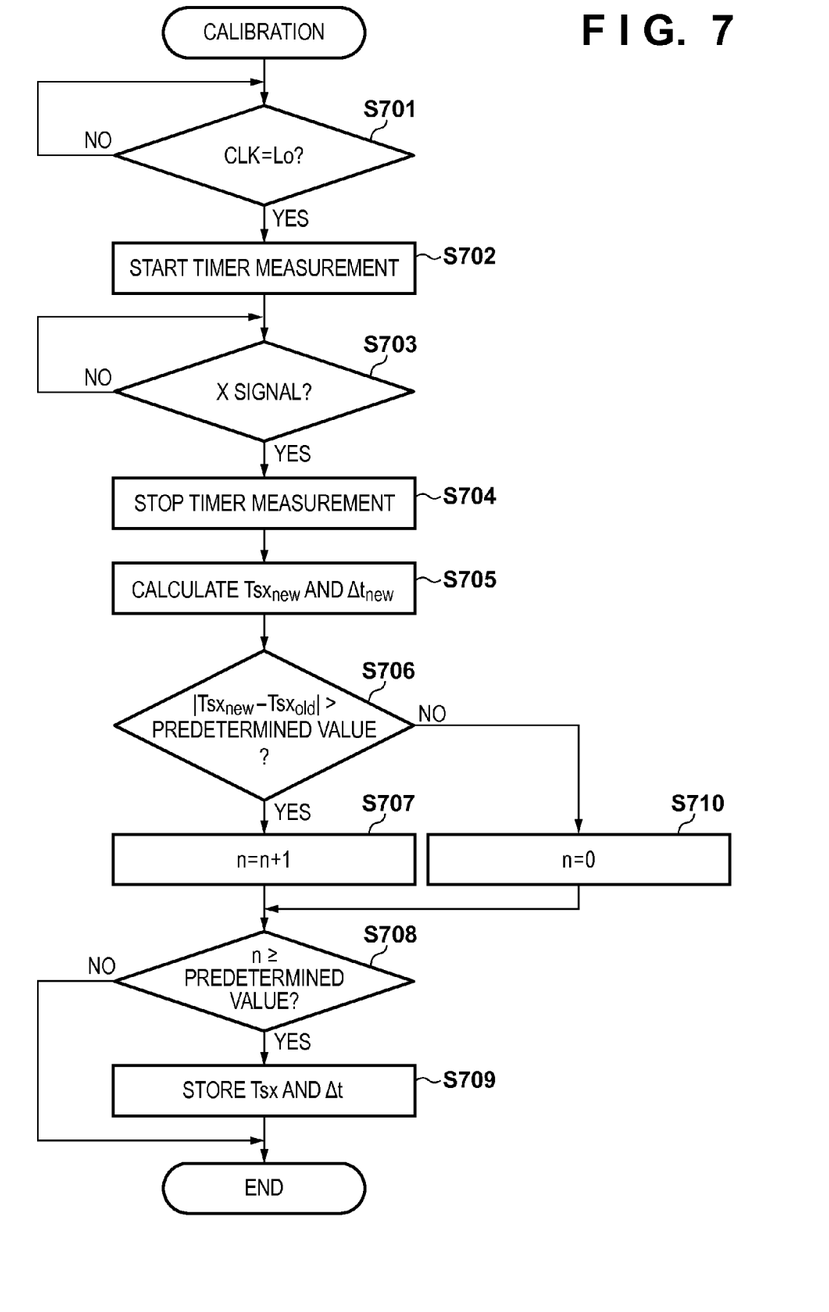
FIG. 7 is a flowchart for explaining still another operation example of the flash apparatus according to the embodiment.

The second embodiment will be explained below with reference to FIG. 7. Note that in this embodiment, an imaging system view, camera arrangement view, and flash arrangement view are the same as FIGS. 1A, 2, and 3 explained in the first embodiment, so an explanation thereof will be omitted. The feature of this embodiment is that the transmission timing adjustment value calculated by calibration can be adjusted. Note that the flowchart shown in FIG. 7 is performed whenever a camera body 100 executes imaging.

First, in step S701, whether a CLK terminal has changed to Lo is repetitively determined. If the CLK terminal has changed to Lo, the process advances to step S702, and a flash microcomputer 326 starts timer measurement by using an internal timer (not shown) of the microcomputer. Then, the process advances to step S703, and whether an X signal is detected is repetitively determined. If the X signal is detected, the process advances to step S704, and the timer having started measurement in step S702 is stopped. Subsequently, the process advances to step S705, and the flash microcomputer 326 obtains a time Tsx measured by the timer, and calculates a predetermined time Δt by using equation (1). Let Tsxnew and Δt new respectively be Tsx and Δt calculated in step S705. The process then advances to step S706, and whether the absolute value of the difference between Tsx (Tsxold) recorded in a nonvolatile memory 322 and Tsxnew exceeds a predetermined value is determined. If the absolute value exceeds the predetermined value, the process advances to step S707, and a count value n indicating the number of times the absolute value of the difference between Tsxnew and Tsxold exceeds the predetermined value is incremented. If the absolute value of the difference between Tsxnew and Tsxold is equal to or smaller than the predetermined value in step S706, the process advances to step S710, and the count value n is cleared to 0. After that, the process advances to step S708.

In step S708, whether the count value n is equal to or larger than a predetermined number of times. If the count value n is equal to or larger than the predetermined number of times, the process advances to step S709, and Tsxnew and Δtnew are stored as new correction values in the nonvolatile memory 322. If the count value n is smaller than the predetermined number of times in step S708, the process is terminated. That is, if the state in which the absolute value of the difference between Tsxnew and Tsxold exceeds the predetermined value occurs a predetermined number of times in succession, the transmission timing adjustment value stored in the nonvolatile memory 322 is updated.

In this embodiment as explained above, the flash connected to the camera body 100 adjusts and updates the transmission timing of a light emission control command to the slave flash. Accordingly, even when the shutter traveling time of the camera body 100 changes due to, for example, a characteristic change caused by the peripheral environment of the camera or the elapse of time, the light emission timing of the master flash can be matched with that of the slave flash. That is, even when the master flash apparatus is connectable to various cameras, the control timings of the master flash apparatus and slave flash apparatus can be matched with each other.

Third Embodiment

An arrangement and processing by which a camera body 100 adjusts the control command transmission timing will be explained below. Note that in this embodiment, an imaging system view, camera arrangement view, and flash arrangement view are the same as FIGS. 1A, 2, and 3 explained in the first embodiment, so an explanation thereof will be omitted.

Figure 8:
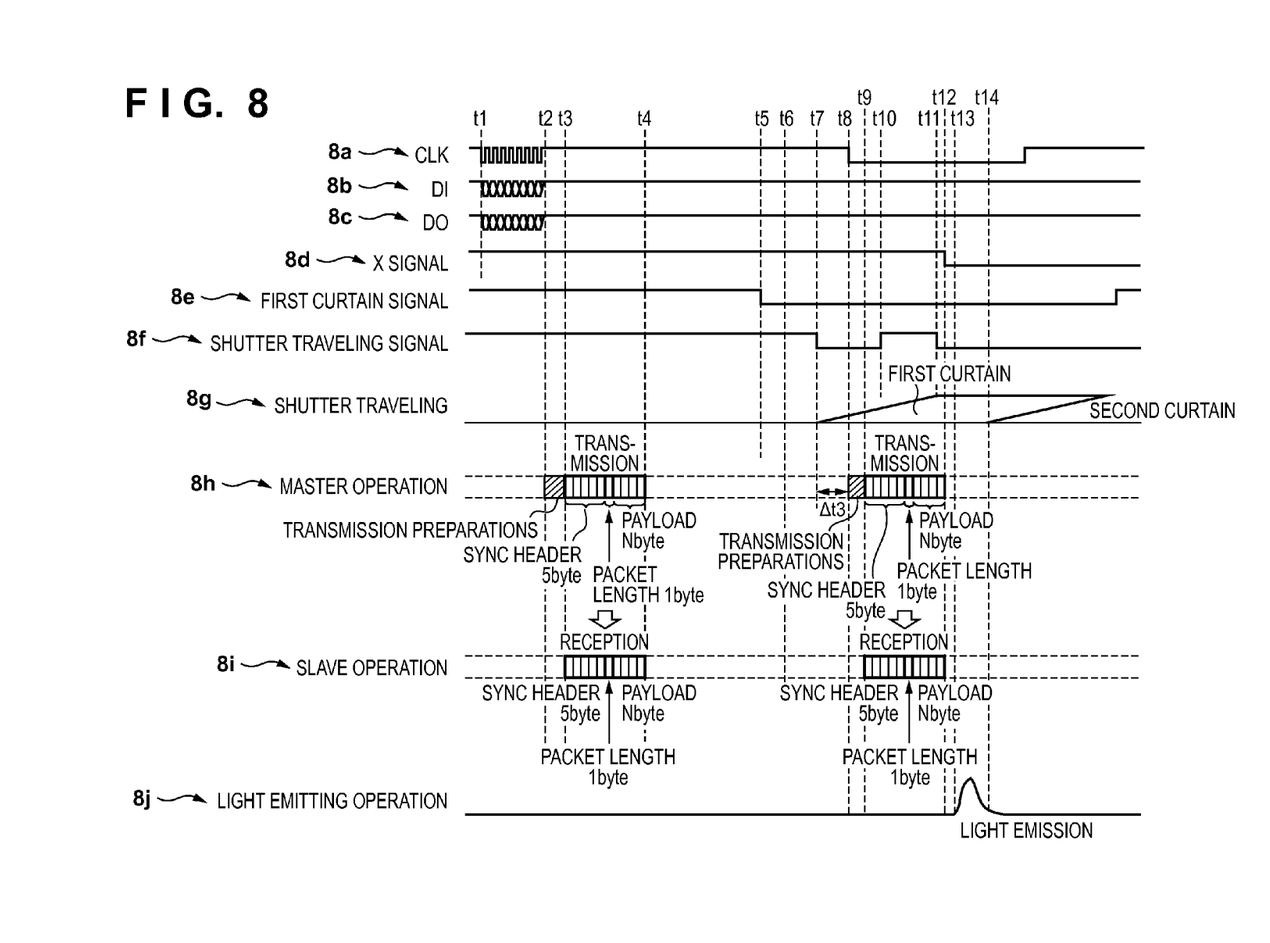
FIG. 8 is a timing chart for explaining an operation example of the imaging system according to the embodiment.

FIG. 8 shows the relationship between the wireless communication timing and light emission timing in this embodiment. The difference of FIG. 8 from FIG. 4 is the time at which a CLK terminal is set at Lo level. At time t8, a camera microcomputer 201 sets the CLK terminal at Lo level, and commands light emission start (a first light emission start command). In this state, if a flash microcomputer 326 of a master flash MS1 detects the trailing edge of CLK at time t8, the flash microcomputer 326 inserts a light emission start command (second light emission start command) into a payload, and transmits a wireless packet to a slave flash SS1. The timing of time t8 is the time for matching with the light emission timing of the master flash, and a determination method will be explained later.

At time t12, the camera microcomputer 201 notifies the flash microcomputer 326 of the master flash MS1 of an X signal (light emission command) via an X terminal. The master flash MS1 detects this X signal at time t12, turns on a light emission control circuit 309, and generates a light emission trigger voltage by operating a trigger circuit 308. If the slave flash SS1 receives the light emission start command by the wireless packet at time t12 and generates a light emission trigger voltage, the slave flash SS1 can emit light at the same timing as that of the master flash MS1. Therefore, as the timing at which the slave flash SS1 can receive the light emission start command at time t12, the master flash MS1 need only start wireless transmission at time t8 as a timing earlier by a wireless communication delay time tw than time t12.

The delay time tw is a time unique to the flash apparatus, and is uniquely determined in accordance with the performance of the wireless unit. In this embodiment, therefore, the master flash MS1 notifies the camera body 100 SS1 of the delay time tw during initialization communication.

Time t8 in this embodiment is the timing at which a predetermined time Δt3 has elapsed after the camera microcomputer 201 detects the start of traveling of the first curtain at time t7. Letting Tsh be the traveling time of the shutter first curtain, and Tx be a time from the completion of first curtain traveling at time t11 to the X signal at time t12, the following equation holds:

$$Tsh + tx = \Delta t3 + tw \qquad (2)$$

Since the shutter traveling time changes from one camera body to another, Δt3 also changes from one camera body to another. Accordingly, this embodiment introduces an arrangement which corrects Δt3 for each camera.

Figure 9:
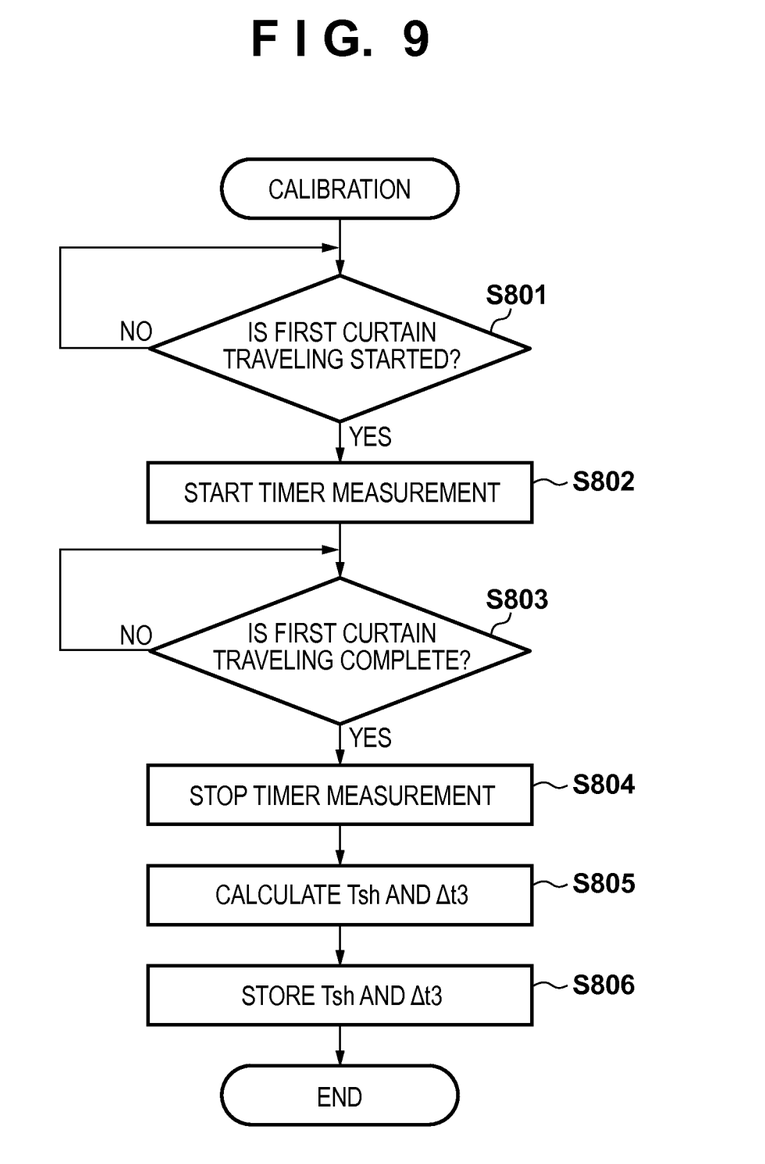
FIG. 9 is a flowchart for explaining an operation example of the flash apparatus according to the embodiment.

Next, calibration for correcting the timing of time t8 at which the camera body 100 transmits the light emission start command by the wireless packet will be explained with reference to a flowchart shown in FIG. 9. When this calibration is started, whether first curtain traveling is started is repetitively determined in step S801. If the first curtain starts traveling, the camera microcomputer 201 starts timer measurement by using an internal timer (not shown) of the microcomputer. Then, in step S803, whether the traveling of the first curtain is complete is repetitively determined. If the completion of first curtain traveling is detected, the camera microcomputer 201 stops the measurement by the timer. This means that the shutter traveling time Tsh as the time from time t7 to time t11 explained with reference to FIG. 8 is measured.

Then, the process advances to step S805, the camera microcomputer 201 obtains the time Tsh measured by the timer, and calculates the predetermined time Δt3 from the wireless communication delay time tw and tx by using equation (2). Subsequently, the process advances to step S806, and the calculated Tsh and Δt3 are recorded in a nonvolatile memory 223 of the camera body 100 in association with the model code and serial number of a flash apparatus 300.

Note that the calibration according to this embodiment may also be executed in a factory when the camera is manufactured. Also, as explained in the modification of the first embodiment, the calibration may also be executed by the user of the camera or executed whenever the camera is powered on. Furthermore, wireless communication need not be performed when executing the calibration. That is, the camera microcomputer 201 need only cause the shutter first curtain to travel by controlling the shutter control circuit 208, and measure the time Tsh from time t7 to time t11.

Figure 1B:
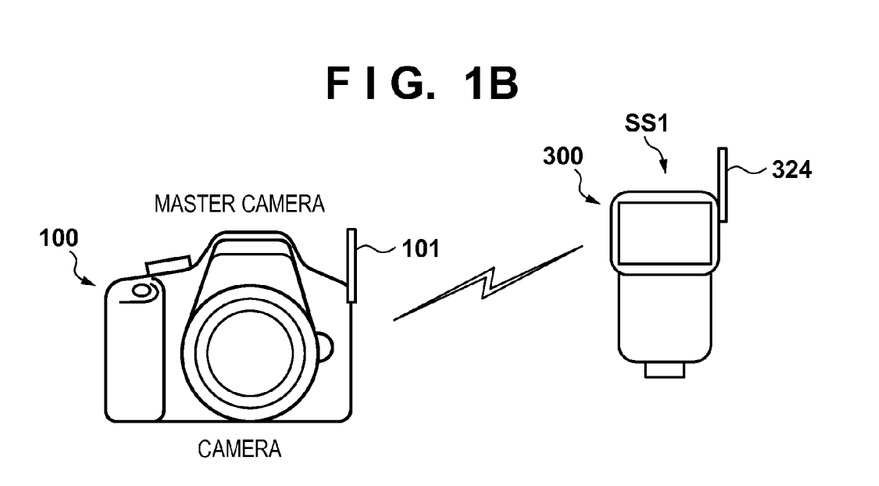

In this embodiment, the case in which the wireless unit of the master flash MS1 and that of the slave flash SS1 communicate with each other has been explained. As shown in FIG. 1B, however, it is also possible to incorporate the wireless unit and a wireless antenna 101 into the camera body 100, and connect the wireless unit to the slave flash SS1 via wireless communication. In this case, the camera body 100 as a master control apparatus can transmit the light emission start command by a wireless packet to the slave flash SS1 at the timing of time t8.

In this embodiment as explained above, the shutter traveling speed as a control signal to be output from the camera body 100 is measured, and the timing of transmission of the light emission control command to the slave flash is adjusted based on the wireless communication delay time. Accordingly, it is possible to match the light emission timing of the master control apparatus with that of the slave flash apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-001236, filed Jan. 7, 2014, which is hereby incorporated by reference herein in its entirety.

What is claimed is:

1. A master flash apparatus which is connected to an image capturing device, and emits light when said image capturing device outputs a synchronous light emission command synchronized with traveling of a shutter after said image capturing device outputs a first light emission start command, wherein said master flash apparatus can perform wireless communication with a slave flash apparatus which emits light in response to a second light emission start command received from said master flash apparatus, and said master flash apparatus comprising:

a transmission unit configured to transmit the second light emission start command to said slave flash apparatus when a predetermined time has elapsed after said image capturing device outputs the first light emission start command;

a measurement unit configured to measure a time from the output of the first light emission start command from said image capturing device to the output of the synchronous light emission command from said image capturing device; and an adjustment unit configured to adjust the predetermined time based on the time measured by said measurement unit.

2. The apparatus according to claim 1, wherein said adjustment unit further adjusts the predetermined time based on a delay time of wireless communication with said slave flash.

3. The apparatus according to claim 1, wherein said master flash apparatus further comprises a storage unit configured to store a value of the time measured by said measurement unit, and a value of the predetermined time adjusted by said adjustment unit.

4. The apparatus according to claim 1, further comprising an alert unit configured to perform an alert if the adjustment of the predetermined time by said adjustment unit is not complete.

5. The apparatus according to claim 2, further comprising an update unit configured to update the value of the predetermined time stored in said storage unit, if an absolute value of a difference between the time measured by said measurement unit and the time stored in said storage unit exceeds a predetermined value a predetermined number of times in succession.

6. The apparatus according to claim 1, wherein said master flash apparatus is detachable from said image capturing device.

7. A master flash apparatus which is connected to an image capturing device, and emits light when said image capturing device outputs a synchronous light emission command synchronized with traveling of a shutter, wherein said master flash apparatus is configured to perform wireless communication with a slave flash apparatus which emits light in response to a light emission start command received from said master flash apparatus, and said master flash apparatus comprising:

a transmission unit configured to transmit the light emission start command to said slave flash apparatus when a predetermined time has elapsed after said image capturing device starts traveling of a first curtain of the shutter;

a measurement unit configured to measure a time from the start to completion of the traveling of the first curtain performed by said image capturing device; and an adjustment unit configured to adjust the predetermined time based on the time measured by said measurement unit.

8. A control method of a master flash apparatus which is connected to an image capturing device, and emits light when the image capturing device outputs a synchronous light emission command synchronized with traveling of a shutter after the image capturing device outputs a first light emission start command, the master flash apparatus being capable of performing wireless communication with a slave flash apparatus which emits light in response to a second light emission start command received from the master flash apparatus, the method comprising:

transmitting the second light emission start command to the slave flash apparatus when a predetermined time has elapsed after the image capturing device outputs the first light emission start command;

measuring a time from the output of the first light emission start command from the image capturing device to the output of the synchronous light emission command from the image capturing device; and adjusting the predetermined time based on the measured time.

9. A computer-readable storage medium storing a program which causes a computer to execute each step of a control method defined in claim 8.

10. A control method of a master flash apparatus which is connected to an image capturing device, and emits light when the image capturing device outputs a synchronous light emission command synchronized with traveling of a shutter, the master flash apparatus being capable of performing wireless communication with a slave flash apparatus which emits light in response to a light emission start command received from the master flash apparatus, the method comprising:

transmitting the light emission start command to the slave flash apparatus when a predetermined time has elapsed after the image capturing device starts traveling of a first curtain of the shutter;

measuring a time from the start to completion of the traveling of the first curtain performed by the image capturing device; and adjusting the predetermined time based on the measured time.

11. A computer-readable storage medium storing a program which causes a computer to execute each step of a control method defined in claim 10.

* * * * *